United States Patent [19] [11] 4,371,551
Fulger et al. [45] Feb. 1, 1983

[54] MALT-LIKE FLAVOR FROM CEREAL GRAIN ROOT CULTURES

[75] Inventors: Charles V. Fulger, Millwood; Gerhard J. Haas, Woodcliff Lake; Edwin B. Herman, Mohegan Lake; Charles R. Lazarus, Ossining, all of N.Y.

[73] Assignee: General Foods Corporation, White Plains, N.Y.

[21] Appl. No.: 245,804

[22] Filed: Mar. 20, 1981

[51] Int. Cl.³ ............................................. A23L 1/185
[52] U.S. Cl. ..................................... 426/28; 426/622; 426/627; 426/64; 426/620; 426/592
[58] Field of Search ................. 426/28, 49, 44, 64, 426/627, 622, 620, 592

[56] References Cited

U.S. PATENT DOCUMENTS

| | | | |
|---|---|---|---|
| 873,946 | 12/1907 | Van Der Kammer | 426/93 |
| 976,488 | 11/1910 | Nelson | 426/44 |
| 1,269,100 | 6/1918 | Leibrandt | 426/28 |
| 1,544,648 | 7/1925 | Kellogg | 426/28 |
| 1,544,649 | 7/1925 | Kellogg | 426/28 |
| 1,744,581 | 1/1930 | Schneible et al. | 426/28 |
| 3,556,946 | 1/1971 | Polen | 195/71 |
| 4,052,795 | 10/1977 | Pollock et al. | 34/12 |

FOREIGN PATENT DOCUMENTS

| | | | |
|---|---|---|---|
| 1216009 | 10/1964 | Fed. Rep. of Germany | 47/1.2 |
| 1316226 | 5/1973 | United Kingdom | 426/28 |

OTHER PUBLICATIONS

Reinert et al., Plant Cell, Tissue and Organ Culture, 1977, Springer-Verlag; New York, pp. 144–153.

*Primary Examiner*—Joseph M. Golian
*Attorney, Agent, or Firm*—Thomas A. Marcoux; Thomas R. Savoie

[57] ABSTRACT

A process for producing a food composition possessing a malt-like flavor is disclosed. The process involves germinating a cereal grain seed until sprouted roots develop. The sprouted roots are explanted and are then grown on a nutrient medium. The cultured roots are then harvested and heated to develop the malt-like flavor. The composition may be utilized as a source of malt flavor in a foodstuff or beverage.

7 Claims, No Drawings

US Patent 4,371,551

MALT-LIKE FLAVOR FROM CEREAL GRAIN ROOT CULTURES

TECHNICAL FIELD

This invention relates to a process for producing a composition possessing a malt-like flavor from root cultures which have been derived from a cereal grain seed and to the use of this material in foodstuffs.

BACKGROUND ART

Malt, a processed grain, is widely used in the manufacture of fermented alcoholic beverages for which it supplies fermentable sugars, flavoring, certain enzymes and other important ingredients. The art of malting grain is an ancient art which has been practiced through the centuries and dates back as far as the early Egyptians. Malting essentially consists of allowing such grains as wheat, rye or barley to partially germinate under controlled conditions whereby certain chemical and physiological changes take place. The malting process may be divided into three main steps, steeping, germination and kilning. Steeping consists of soaking the grain in water having a temperature of from about 50° F. (10° C.) to about 65° F. (18° C.) until the grains have absorbed enough moisture to start germination. The steeped grain is then transferred into compartments where enough water is added to maintain the moisture content up to about 45 to about 50% and where under controlled temperature and moisture conditions germination takes place. After the desired amount of germination has taken place, during which time the grain has developed rootlets and coleoptile, and produced such starch-splitting enzymes as $\alpha$- and $\beta$-amylase, the grain is dried with hot air in the kilning step. The kilning terminates any further germination and imparts the aroma and flavor giving properties to the grain. The rootlets which do not naturally fall off during kilning are intentionally removed from the grain after the kilning step. Malt in its finished form is substantially free of root material.

Malted grains, especially malted barley, have also been used to add a malt flavor to foodstuffs. However, in the conventional processing of barley, the roots and shoots are separated from the endosperm and discarded. The flavor of malted barley is derived from the processed endosperm. Rootlets have never been made use of in food products as a malt flavorant additive.

DISCLOSURE OF THE INVENTION

The present inventors found through their work in cereal experimentation that cereal grain roots were very flavorful. This realization led to the idea of culturing roots and the incorporation of the harvested root material into a foodstuff or beverage to add malt flavor.

This invention involves a new process wherein cereal grain seeds are cleansed and incubated until germination. The sprouted roots resulting from germination are explanted and cultured on nutrient medium where they are grown under suitable time and temperature conditions. After having attained sufficient mature growth the root cultures are harvested and heated or toasted. The toasted, cultured root product possesses an unexpected malt-like flavor. The toasted, cultured root product produced from buckwheat cereal grain when incorporated into a breakfast cereal was perceived to be about fifteen times more flavorful than a breakfast cereal containing an identical quantity of typical malted barley.

Once the roots are selected and cultured, no separation technique is required in this new process since all of the cultured root material is utilized.

Malt-like flavors are highly concentrated in the cultured root tissue of the cereal grains. Malted barley is usually used as the standard source for supplying a malt flavor composition. The toasted cereal grain root material produced in accordance with the present invention possesses a malt-like flavor which is significantly more concentrated than malted barley. The intensity of the malt flavor will depend on the source and selection of the cereal grain as well as the method of preparation of the root culture.

BEST MODE FOR CARRYING OUT THE INVENTION

Appropriate cereal grains which may be utilized in conjunction with the present invention include buckwheat, wheat, barley, oats, rye, corn, rice and sorghum. Of the cereal grains investigated, buckwheat appeared to be preferable because in laboratory experimentation buckwheat root cultures gave the best results in tissue culturing.

After germination, the sprouted roots are explanted and placed on the nutrient medium. Growing conditions may vary but those skilled in the art will appreciate the advantages of optimizing growing temperature, nutrient concentrations and aeration in order to accelerate the growth process. The temperature range is from 10° C. to 40° C. with preferred temperatures ranging from 20° C. to 30° C. The cultured roots may be harvested at any appropriate time. If the cultured roots are allowed to grow for an excessive period of time, necrotic material will be produced which will lead to the development of off-flavors. Instead of batch processing, alternative methods such as continuous propagation can be utilized.

After harvesting, the roots are heated or toasted. Heating temperatures are chosen to optimize the flavor development of the particular cereal grain culture. Heating times will vary depending upon the temperature which is selected. Air flow is a factor in determining both the temperature and time. Heating times may vary from as short a period as 10 seconds when temperatures as high as 200° C are utilized. Conversely, heating times as long as 48 hours are possible when the heating temperature is as low as 50° C. The preferred heating temperature is about 60° C. for approximately 12 hours to accomplish toasting of the buckwheat root material. The moisture content of the final product is typical of toasted cereals, varying from 0.5 to 5.0%.

The toasted root culture material may be incorporated into any foodstuff or beverage where a malt flavor is desirable. Appropriate foodstuffs include cereals (i.e., ready-to-eat breakfast cereals), confectionary items, bakery products, meat coating mixes, pet foods, snack items, etc. In a food product the level of the incorporated cereal grain root culture material will range from 0.1% to 5% by weight, dry basis.

Additionally, the malt-flavored root material produced in accordance with the present invention may be useful as a source of malt flavor in the process of making a fermentable alcoholic beverage. It will be especially useful as a flavorant in brewery processes where all or most of the barley malt has been replaced by other less costly ingredients. In such a process the malt-flavored roots could be incorporated into the mash. While the final beverage product will not contain insoluble particles of the root material because such particles will be removed during straining, filtration, or decantation, the alcoholic beverage will pick up flavor notes which will impart a malt-like flavor. Alternatively, an extract could be prepared from the malt-flavored root material and the extract could be incorporated into a foodstuff.

Optionally, the harvested root material in its unheated, untoasted condition can be incorporated into a foodstuff. Thereafter, the combination is heated giving a baked product possessing a malt flavor.

The invention is illustrated, but not limited, by the following examples of the preparation of the root culture and the incorporation of the toasted root culture into a cereal product. One skilled in the art would recognize that various additional modifications could be made without deviating from the scope of the invention.

EXAMPLE 1

Buckwheat seeds are surface sterilized by immersion in 95% ethanol for one minute, then a saturated calcium hypochlorite solution for 20 minutes, followed by three rinses in sterile 0.85% saline. The seeds are then incubated on sterile saline-moistened filter paper in petri dishes in the dark until germination occurs (4–5 days). Sprouted roots are selected from mold-free petri dishes, sterilized as above, but with only 5 minutes in calcium hypochlorite solution, and aseptically explanted onto an agar medium of the following composition:

| Component | mg/l | Component | mg/l |
| --- | --- | --- | --- |
| $NaH_2PO_4.H_2O$ | 90 | $ZnSO_4.7H_2O$ | 3 |
| $Na_2HPO_4$ | 30 | $Na_2MoO_4.2H_2O$ | 0.25 |
| KCl | 300 | $CuSO_4$ | 0.25 |
| $(NH_4)_2SO_4$ | 200 | $CoCl_2.6H_2O$ | 0.25 |
| $MgSO_4.7H_2O$ | 250 | Nicotinic Acid | 1 |
| $KNO_3$ | 1000 | Thiamine | 10 |
| $CaCl_2.2H_2O$ | 150 | Pyridoxine | 1 |
| KI | 0.75 | Myo-Inositol | 100 |
| Iron Sulfate plus $Na_2EDTA$ (Sequestrene 330 Fe, Trademark of Geigy Agricultural) | 28 | Sucrose | 20,000 |
|  |  | N—Z Amino type A Casein Hydrolysate (Sheffield Chemical) | 2 |
| $MnSO_4.H_2O$ | 10 | NAA (Alpha naphthalene acetic acid) | 2 |
| $H_3BO_3$ | 3 |  |  |

The explants are incubated under 10,000 lux fluorescent light at 28° C. for 12 hours followed by dark at 25° C. for 12 hours. (Light does not appear to be an important factor for growth of the root culture).

After roots and callus form on the above medium, the cultures are transferred to liquid B-5 medium (Grand Island Biological Co.) and incubated at ambient room temperature and light conditions on a rotary shaker at 150 cps, resulting in rapid root growth after several passages. The cultured roots are toasted at 80° C. for 24 hours. The toasted cultured roots have a malt-like flavor which in a blind taste test was found to be considerably more flavorful than toasted buckwheat sprout roots.

EXAMPLE 2

Dried cultured buckwheat roots produced according to Example 1 were included as an ingredient in a drum-dried, corn cereal prototype for flavor evaluation. The corn cereal had the following compositional makeup:

| Root Culture | |
| --- | --- |
| Grits | 75 g |
| Sugar | 31 g |
| Corn Bran | 8 g |
| Cultured Buckwheat Roots | 1 g |
| Salt | 0.5 g |
| $H_2O$ | 100 ml |

This corn cereal product with the 1 gram of incorporated buckwheat root culture was compared to a control corn cereal which contained 15 grams of added barley malt.

| Control | |
| --- | --- |
| Grits | 75 g |
| Sugar | 31 g |
| Corn Bran | 8 g |
| Barley Malt | 15 g |
| Salt | 0.5 g |
| $H_2O$ | 100 ml |

The formulation containing the incorporated buckwheat root culture was generally considered by benchtop tasters to have the better flavor which was described as more "malty" or "nutty." Except for the flavor, the two samples were similar in all respects.

We claim:

1. A process for the preparation of a composition possessing a malt-like flavor from buckwheat which comprises:
    (a) germinating a buckwheat seed until sprouted roots develop therefrom;
    (b) explanting said sprouted roots from the cereal grain seed and placing them onto a nutrient medium;
    (c) culturing the roots until they have matured sufficiently by harvesting;
    (d) harvesting the cultured roots prior to production of necrotic material; and
    (e) heating the harvested cultured roots until a malt-like flavor is developed.

2. The process according to claim 1 further comprising the additional step of admixing the harvested roots with a foodstuff before heating.

3. The process according to claim 1 wherein the heating of the harvested roots ranges from 10 seconds at temperatures as high as 200° C. to 48 hours at temperatures as low as 50° C.

4. The process according to claim 3 wherein the harvested, cultured buckwheat roots are heated for approximately 12 hours at about 60° C.

5. The composition produced in accordance with claim 1.

6. The process according to claim 1 further comprising the steps of obtaining an extract from the heated, harvested cultured roots and incorporating said extract into a foodstuff.

7. The process according to claim 6 wherein said foodstuff is an alcoholic beverage.

* * * * *